United States Patent
Yu

(10) Patent No.: US 8,509,524 B2
(45) Date of Patent: Aug. 13, 2013

(54) DEVICE, METHOD AND PROGRAM ON A STORAGE MEDIUM TO ADJUST DICTIONARY DATA RELATED TO OBJECTS WITH SPECIFIC FEATURES

(75) Inventor: Shanshan Yu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 12/951,281

(22) Filed: Nov. 22, 2010

(65) Prior Publication Data

US 2011/0123102 A1    May 26, 2011

(30) Foreign Application Priority Data

Nov. 26, 2009 (JP) ................... 2009-269296

(51) Int. Cl.
*G06K 9/62* (2006.01)

(52) U.S. Cl.
USPC .......................................................... 382/159

(58) Field of Classification Search
None
See application file for complete search history.

(56) References Cited

U.S. PATENT DOCUMENTS

| | | | |
|---|---|---|---|
| 2004/0109611 A1* | 6/2004 | Perlmutter et al. | 382/254 |
| 2007/0206231 A1* | 9/2007 | Singh | 358/302 |
| 2008/0152238 A1 | 6/2008 | Sarkar | |
| 2008/0181508 A1 | 7/2008 | Kaneda et al. | |
| 2009/0169055 A1* | 7/2009 | Ishikawa | 382/104 |
| 2010/0191391 A1* | 7/2010 | Zeng | 701/1 |

FOREIGN PATENT DOCUMENTS

| | | |
|---|---|---|
| JP | 2004-246618 | 9/2004 |
| JP | 2008-159056 | 7/2008 |
| JP | 2008-186303 | 8/2008 |

* cited by examiner

*Primary Examiner* — Nirav G Patel
(74) *Attorney, Agent, or Firm* — Staas & Halsey LLP

(57) ABSTRACT

An image processing device includes a dictionary data storage unit to store dictionary data regarding features that a plurality of objects has, an arithmetic unit to compute feature data of an input image based on information of the input image that includes an object with a specific feature among the plurality of objects, and a calculation unit to calculate a parameter for adjusting the dictionary data regarding the object with the specific feature based on the feature data and the dictionary data.

16 Claims, 11 Drawing Sheets

FIG. 3

| LOCAL OPERATOR | FACE LEARNING DATA | NON-FACE LEARNING DATA | | | LEARNING DICTIONARY | | IMPORTANCE |
|---|---|---|---|---|---|---|---|
| | a (RATIO THAT COEFFICIENT VALUE IS 1) | b (RATIO THAT COEFFICIENT VALUE IS 0) | c (RATIO THAT COEFFICIENT VALUE IS 1) | d (RATIO THAT COEFFICIENT VALUE IS 0) | e (COMPUTED VALUE INDICATING LIKELIHOOD THAT COEFFICIENT VALUE IS 1) | f (COMPUTED VALUE INDICATING LIKELIHOOD THAT COEFFICIENT VALUE IS 0) | |
| 1 | 0.7 | 0.3 | 0.5 | 0.5 | 0.146 | -0.222 | ... |
| 2 | 0.4 | 0.6 | 0.6 | 0.4 | -0.176 | 0.079 | ... |
| ... | ... | ... | ... | ... | ... | ... | ... |

FIG. 8

| IMAGE DATA NO. | ATTRIBUTE OF IMAGE (FACE: 1, NON-FACE: -1) | VALUE "e" OR "f" THAT CORRESPONDS TO COEFFICIENT VALUE "e" (1→VALUE "e", 0→VALUE "f") | ATTRIBUTE ACCORDING TO SIGN OF VALUE "e" OR "f" ("+"→FACE: 1, "-"→NON-FACE: -1) | WEIGHT "A" WHEN ACTUAL ATTRIBUTE AND ATTRIBUTE ACCORDING TO SIGN OF VALUE "e" OR "f" MATCH (INITIAL VALUE 0) | WEIGHT "B" WHEN ACTUAL ATTRIBUTE AND ATTRIBUTE ACCORDING TO SIGN OF VALUE "e" OR "f" DO NOT MATCH (INITIAL VALUE 0) |
|---|---|---|---|---|---|
| 1 | 1 | f(0.222) | -1 | 0 | 0.222 |
| 2 | 1 | e(0.146) | 1 | 0.146 | 0.222 |
| 3 | 1 | e(0.146) | 1 | 0.292 | 0.222 |
| 4 | 1 | e(0.146) | 1 | 0.438 | 0.222 |
| 5 | 1 | e(0.146) | 1 | 0.584 | 0.222 |
| 6 | -1 | f(0.222) | -1 | 0.806 | 0.222 |
| 7 | -1 | f(0.222) | -1 | 1.028 | 0.222 |
| 8 | -1 | e(0.146) | 1 | 1.028 | 0.444 |
| 9 | -1 | f(0.222) | -1 | 1.250 | 0.444 |
| 10 | -1 | f(0.222) | -1 | 1.472 | 0.444 |

LOCAL OPERATOR1
LOCAL OPERATOR2
LOCAL OPERATOR3
LOCAL OPERATOR12

DEVICE, METHOD AND PROGRAM ON A STORAGE MEDIUM TO ADJUST DICTIONARY DATA RELATED TO OBJECTS WITH SPECIFIC FEATURES

CROSS-REFERENCE TO RELATED APPLICATIONS

This application is based upon and claims the benefit of priority of the prior Japanese Patent Application No. 2009-269296, filed on Nov. 26, 2009, the entire contents of which are incorporated herein by reference.

FIELD

The embodiments discussed herein are related to an image processing device, an image processing method, and a storage medium storing an image processing program.

BACKGROUND

Conventionally, technologies to detect various objects (for example, human faces and cars) from image data captured by cameras, etc. have been proposed. For instance, in technologies to detect objects, learning data to which features of objects to be detected is stored beforehand is used. In the object detection technology, whether or not an object to be detected exists in an image is determined by comparing the learning data with the captured image data.

Moreover, technologies to expedite processing of the above described image detection have been proposed. For example, according to the Japanese Laid-open Patent Publication No. 2004-246618, learning data is produced from a plurality of units of image data, and object detection is roughly performed for a search area in image data using the produced learning data. The Japanese Laid-open Patent Publication No. 2004-246618 discusses that a detailed object detection is performed only when it is determined that the image data may include an object to be detected.

SUMMARY

An image processing device may include a dictionary data storage unit to store dictionary data regarding features that a plurality of objects has, an arithmetic unit to compute feature data of an input image based on information of the input image that includes an object with a specific feature among the plurality of objects, and a calculation unit to calculate a parameter for adjusting the dictionary data regarding the object with the specific feature based on the feature data and the dictionary data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is exemplary data stored in a learning data storage unit according to the second embodiment;

FIG. 8 is the image processing device according to the second embodiment;

DESCRIPTION OF EMBODIMENTS

In an object detection technology, there may be a case in which an object with features that are different from features of objects included in images that are used for producing learning data.

However, in the technology discussed in the Japanese Laid-open Patent Publication No. 2004-246618, detecting a specific object with features that have different tendencies from the tendencies of features of objects included in the images that are used for producing learning data with a high accuracy is difficult. In other words, the above-described learning data includes general features obtained by synthesizing features of objects included in a plurality of images that are used for producing the learning data. Therefore, detecting a specific object with features that have certain tendencies with high accuracy is difficult if learning data in which features of a certain object are not manifested is used.

Meanwhile, producing new learning data that manifests specific features by intensively using images of objects with specific features may be considered. However, producing learning data takes an immense amount of time.

Various embodiments described herein relate to an image processing device, an image processing method and an image processing program that enable to produce data for detecting a specific object from an image with a high accuracy.

Hereinafter, various embodiments of the image processing device, the image processing method, and the image processing program will be described in detail by referring to the accompanying drawings. The technology disclosed herein is not limited by the embodiments, which will be described hereinafter, of the image processing device, the image processing method and the image processing program.

Figure 1:
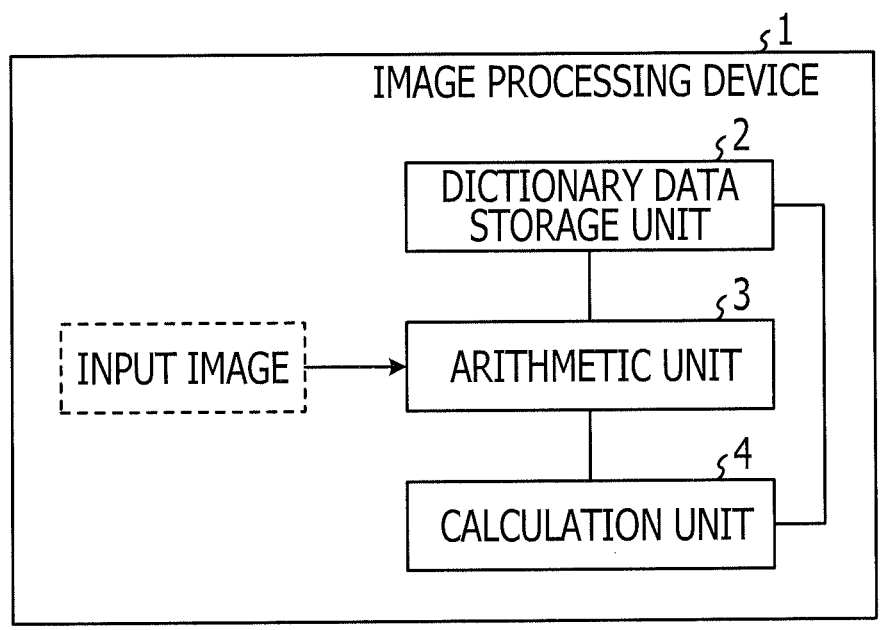
FIG. 1 illustrates an image processing device according to a first embodiment.

FIG. 1 illustrates an image processing device according to a first embodiment. As illustrated in FIG. 1, the image processing device according to the first embodiment includes a dictionary data storage unit 2, an arithmetic unit 3, and a calculation unit 4.

The dictionary data storage unit 2 stores dictionary data regarding features of objects. The arithmetic unit 3 computes feature data of an input image based on information of the input image that includes a specific object among objects. The calculation unit 4 calculates a parameter for adjusting the dictionary data based on the feature data and the dictionary data. The parameter is used to detect the specific object.

In other words, prior to detecting a specific object with features that have different tendencies from those of general features from an image, the image processing device 1 calculates a parameter that is used for determining how the dictionary data regarding general features of objects is used. As described above, the image processing device 1 may efficiently generate data for detecting a specific object with a high accuracy. Accordingly, the image processing device 1 does not have to generate new dictionary data regarding features of a specific object. In other words, the image processing device 1 may detect a specific object by making features of the specific object buried in the dictionary data manifest by using the calculated parameter together with the dictionary data.

Figure 2:
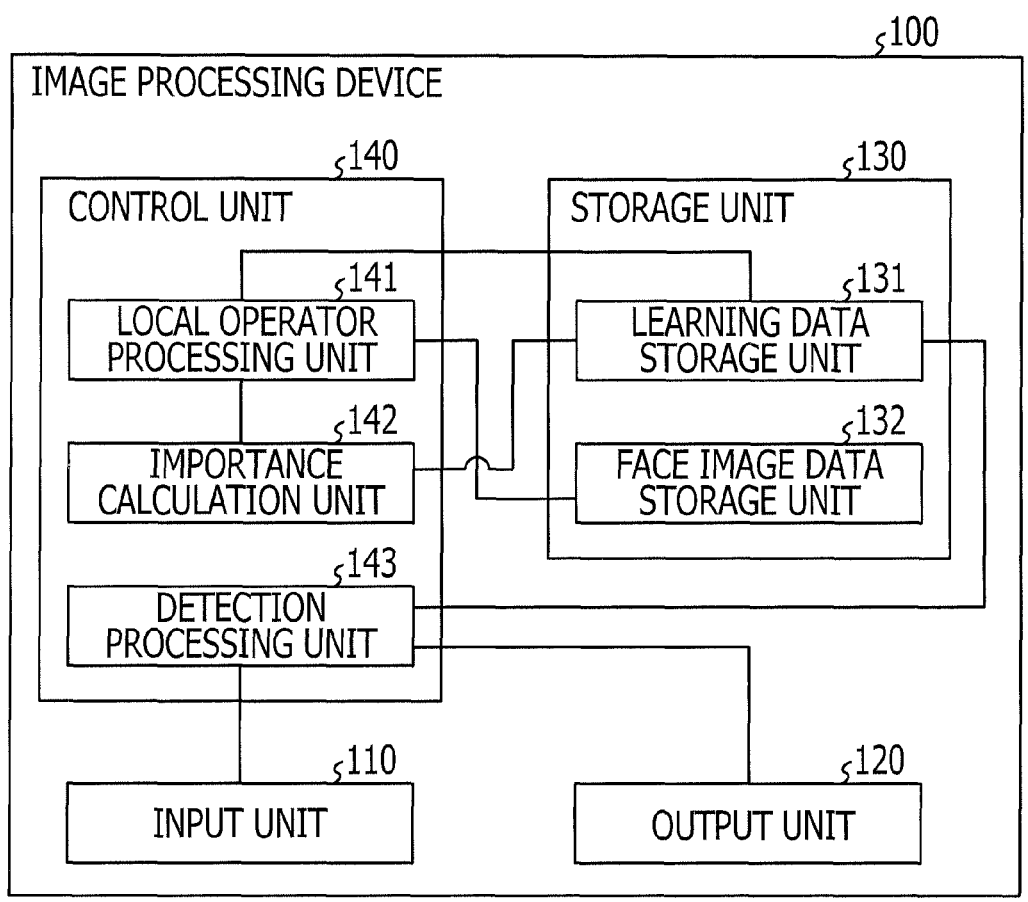
FIG. 2 illustrates a configuration of an image processing device according to a second embodiment.

FIG. 2 illustrates a configuration of an image processing device according to a second embodiment. As illustrated in FIG. 2, an image processing device 100 according to the second embodiment includes an input unit 110, an output unit 120, a storage unit 130, and a control unit 140.

The input unit 110 receives an input of image data that is a subject for face detection processing from a camera device such as a digital camera. For example, image data that is a subject for face detection is data in which a specific object is imaged. An object with general features is called a certain object. An object with features that are different from the general features are called a specific object. For example, when a human face is assumed to be a certain object, a face of a baby may be assumed to be a specific object. This is because the face of the baby has features with different tendencies from the general features that the human face has. Hence, in the second embodiment which will be described below, a face of a baby is discussed as a specific object. The specific object is not limited to the face of the baby, but may be a face with sunglasses, or face of a person of a specific sex or age, for example.

The output unit 120 displays a result of processing performed by a detection processing unit 143, which will be described later, on a monitor or a display.

A storage unit 130 stores data and programs that are desired for various processing performed by a control unit 140. For example, as illustrated in FIG. 2, the storage unit 130 includes a learning data storage unit 131 and a face image data storage unit 132.

The learning data storage unit 131 stores learning data produced for general features that a human face has. FIG. 3 is exemplary data stored in the learning data storage unit 131 according to the second embodiment. As illustrated in FIG. 3, the learning data storage unit 131 stores face learning data, non-face learning data, learning dictionary and importance in association with a local operator.

Figure 4:
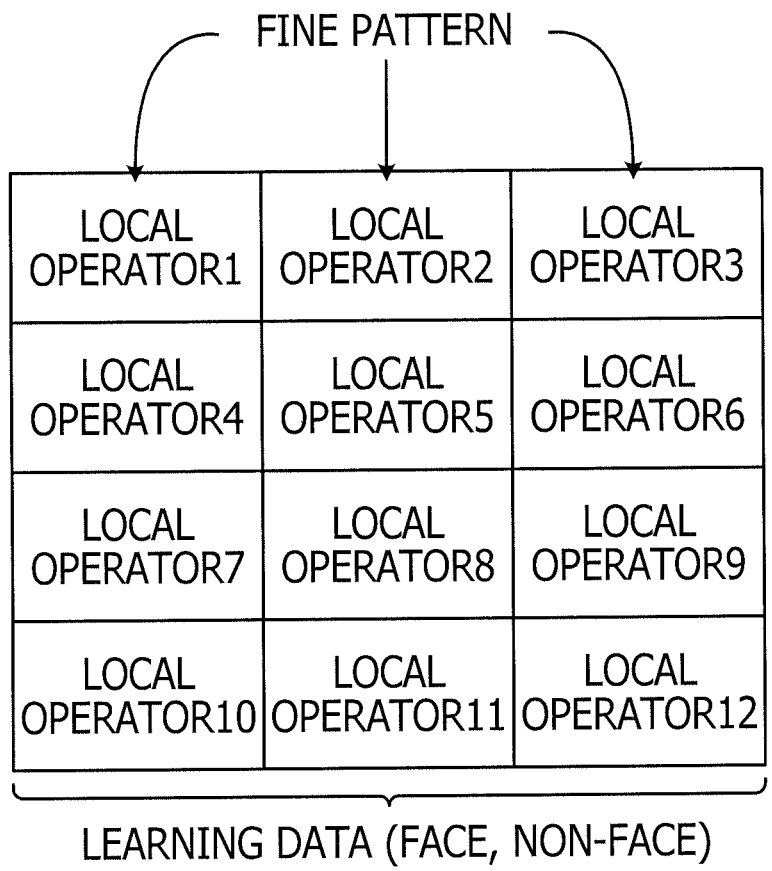
FIG. 4 is the image processing device according to the second embodiment.

The local operator indicates each area obtained by dividing learning data and image data for detection processing, which are captured in the image processing device 100, into a plurality of fine patterns. The learning data is image data of a face or image data of a non-face. The local operator is generated to produce data to be stored in the learning data storage unit 131. As illustrated in FIG. 4, a plurality of units of learning data is divided into twelve areas that are from a local operator 1 to a local operator 12. As the learning data, image data for a plurality of faces and image data of a plurality of non-faces are employed.

Dividing the learning data into twelve areas from the local operator 1 to the local operator 12 illustrated in FIG. 4 is just an example and the embodiment is not limited to this. The learning data storage unit 131 stores a unique number assigned to each local operator as a local operator. For example, 1 and 2 are assigned. The learning data storage unit 131 stores image data that represents general features of a human face as learning data for face detection. The learning data is used for face detection processing. FIG. 4 is the image processing device according to the second embodiment.

The learning data storage unit 131 stores distributions of coefficient values in the same local operator for each of the plurality of units of learning data as face learning data and non-face learning data. The coefficient value is obtained by applying a wavelet conversion (frequency conversion) to each learning data. The details will be described later. The face learning data represents features of an image in which general features of a human face is imaged. Meanwhile, the non-face learning data represents features of an image in which general features of a non-face (for example, a part of body other than the face) is imaged.

For example, as illustrated in FIG. 3, for the local operator 1 of each image data, the learning data storage unit 131 stores a ratio of face image data with a coefficient value is 1, "a=0.7", and a ratio of face image data with a coefficient value is 0, "b=0.3" as face learning data. In other words, the learning data storage unit 131 indicates the ratio of face image data with the coefficient value 1 is 0.7 among all units of the face image data in the local operator 1. Similarly, the learning data storage unit 131 stores, as illustrated in FIG. 3, a ratio of non-face image data with a coefficient value is 1, "c=0.5" and a ratio of non-face image data with a coefficient value is 0, "d=0.5" as non-face learning data.

Processes to produce face learning data and non-face learning data will be described. First, an image processing device 100 captures each learning data (face and non-face) with substantially the same size. The image processing device 100 compares a coefficient value that is obtained by applying wavelet conversion to each of units of the captured learning data with a certain threshold value. The wavelet conversion is a frequency conversion. The image processing device 100 determines that a coefficient value which is a threshold value or more is "1", and a coefficient value which is a threshold value or less is "0." The image processing device 100 totals each of the determined coefficient values for each local operator. The image processing device 100 calculates a ratio of coefficient values included in each local operator for each attribute of the learning data. The attribute is information indicating face or non-face. The image processing device 100 stores a ratio of coefficient values included in each local operator calculated for each attribute of the learning data in items of face learning data and non-face learning data of the learning data storage unit 131 in association with the local operator. The embodiment is not limited to quantize coefficient values to binarized values of 1 and 0, but may quantize to ternary values or four values.

The learning data storage unit 131 stores a computed value that indicates a likelihood that a coefficient value included in each local operator is 1 or 0 in the learning dictionary. For example, as illustrated in FIG. 3, the learning data storage unit 131 stores a computed value "e=0.146" that indicates likelihood that the image data is face image data in the learning dictionary when the coefficient value of the local operator is 1. Moreover, the learning data storage unit 131 stores a computed value "f=−0.222" that indicates a likelihood that the image data is face image data in the learning dictionary when the coefficient value of the local operator is 0. The computed value "e" and the computed value "f" are computed by expressions (1) and (2) below respectively.

Expression 1

$$e = \log(a/c) \quad (1)$$

Expression 2

$$f = \log(b/d) \quad (2)$$

The learning data storage unit 131 stores importance as a parameter for adjusting the learning data for a specific object in association with a local operator. The importance is data used as a criterion to determine selecting which local operator in the learning data for face detection is effective when the image processing device 100 executes face detection processing to detect a specific object. For example, the importance is a value indicating which local operator is likely to represent features of a face of a baby when detecting the face of the baby. The calculation method of the importance will be described where an importance calculation unit 142 will be described.

The face image data storage unit 132 stores a plurality of units of image data in which a specific object that needs complementing the learning data, "baby's face" is imaged, and a plurality of images to which "non-baby's face" is imaged. The image data stored in the face image data storage unit 132 is substantially the same size as the learning data for face detection stored in the learning data storage unit 131, and is used for processing by a local operator processing unit 141, which will be described later.

The control unit 140 includes an internal memory for storing a certain control program, a program in which various processing procedures are defined. The control unit 140 performs various processing by each program. The control unit 140 includes, as illustrated in FIG. 2, the local operator processing unit 141, the importance calculation unit 142, and a detection processing unit 143.

Figure 5:
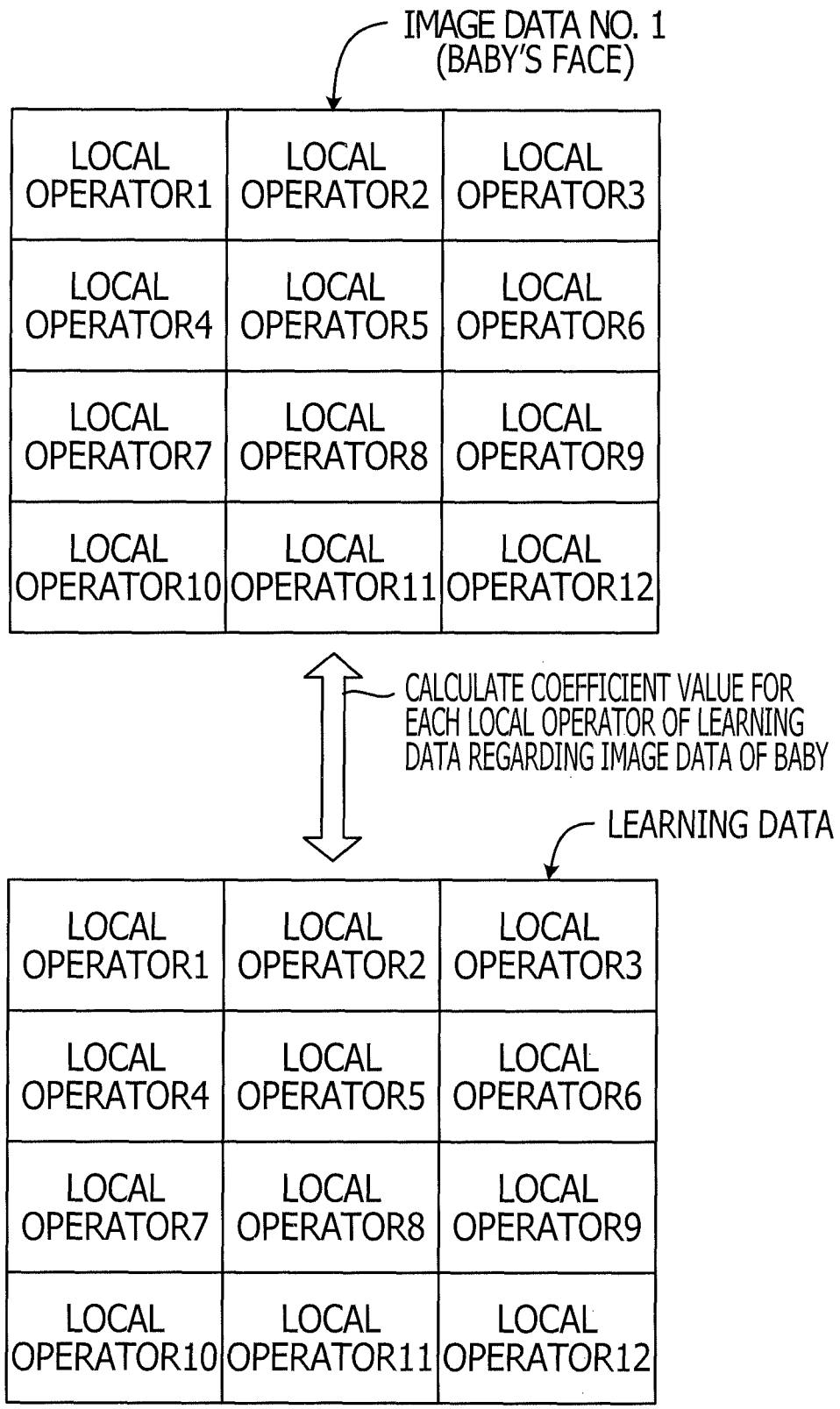
FIG. 5 is the image processing device according to the second embodiment.

The local operator processing unit 141 calculates a coefficient value for each local operator of image data of a specific object that needs complementing the learning data, "baby's face" and image data of "non-baby's face." For example, as illustrated in FIG. 5, the image processing device 100 calculates a coefficient value for each local operator regarding an image data No. 1 of the baby's image captured from the face image data storage unit 132. FIG. 5 is an image processing device according to the second embodiment.

Similarly, the image processing device 100 calculates a coefficient value for each local operator of another image data of a baby that is stored in the face image data storage unit 132. For example, as described above, the local operator processing unit 141 calculates a coefficient value of each local operator of image data of a baby stored in the face image data storage unit 132 when a user, etc. instructs to start processing. The local operator processing unit 141 transmits the calculated coefficient value to an importance calculation unit 142.

Figure 6:
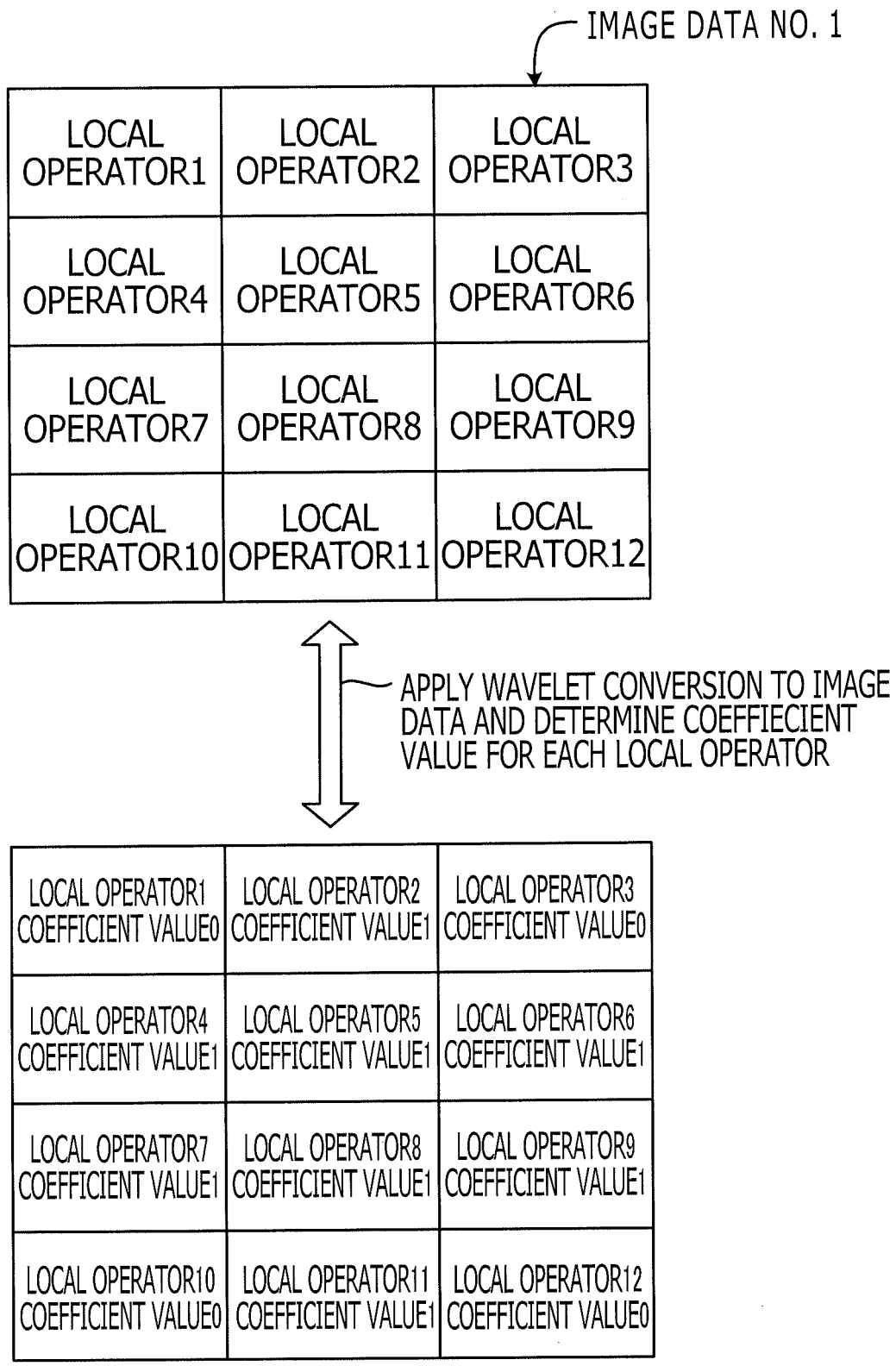
FIG. 6 is the image processing device according to the second embodiment.

FIG. 6 is an image processing device according to the second embodiment. For example, as illustrated in FIG. 6, the local operator processing unit 141 applies a wavelet conversion to the image data No. 1 captured from the face image data storage unit 132. The local operator processing unit 141 determines a coefficient value of either 1 or 0 for each local operator by dividing the image data No. 1 into the same numbers of local operators as those of the learning data.

For example, as illustrated in FIG. 6, the local operator processing unit 141 determines a coefficient value of the local operator 1 as 0, that of the local operator 2 as 1, and that of the local operator 3 as 0. Moreover, as illustrated in FIG. 6, the local operator processing unit 141 determines a coefficient value of the local operator 4 as 1, that of the local operator 5 as 1, and that of the local operator 6 as 1. Moreover, as illustrated in FIG. 6, the local operator processing unit 141 determines a coefficient value of the local operator 7 as 1, that of the local operator 8 as 1, and that of the local operator 9 as 1. Moreover, as illustrated in FIG. 6, the local operator processing unit 141 determines a coefficient value of the local operator 10 as 0, that of the local operator 11 as 1, and that of the local operator 12 as 0. Similarly, the local operator processing unit 141 calculates a coefficient value for each local operator regarding another image data stored in the face image data storage unit 132.

Figure 7:
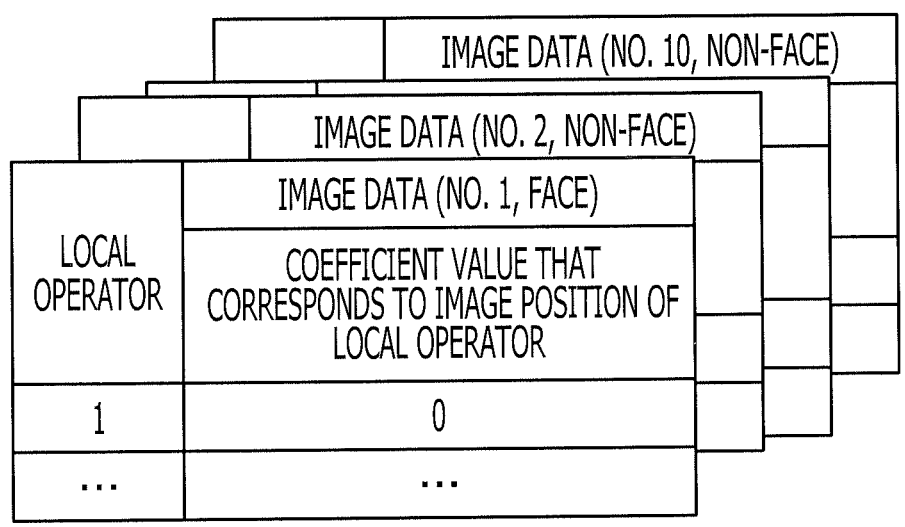
FIG. 7 is the image processing device according to the second embodiment.

The local operator processing unit 141 transmits the coefficient values for each of the local operators of each image data captured from the face image data storage unit 132 together with an attribute (face and non-face) of the image data to the importance calculation unit 142, which will be described later. For example, as illustrated in FIG. 7, the local operator processing unit 141 transmits the coefficient values for each of the local operators of the image data No. 1 and attribute "face" thereof to the importance calculation unit 142. For example, the local operator processing unit 141 transmits the coefficient value 0 for the local operator 1 and an attribute of the image data No. 1, "face" to the importance calculation unit 142. Similarly, the local operator processing unit 141 transmits the coefficient values for each of the local operators and attribute thereof for each of units of image data No. 2 to No. 10 to the importance calculation unit 142. FIG. 7 is an image processing device according to the second embodiment.

The importance calculation unit 142 calculates importance for each local operator to adjust learning data regarding a specific object, a "baby's face." For example, when the importance calculation unit 142 receives a coefficient value for each local operator of each units of image data and data regarding an attribute that are stored in the face image data storage unit 132 from the local operator processing unit 141, the importance calculation unit 142 performs the following processing.

In other words, the importance calculation unit 142 extracts an attribute of each image data from data received from the local operator processing unit 141. The importance calculation unit 142 sets a value according to the extracted attribute in a certain table in association with the image data No. FIG. 8 is an image processing device according to the second embodiment.

For example, the importance calculation unit 142 sets a value of 1 that indicates a face in the certain table when an attribute of image data is a face. Meanwhile, the importance calculation unit 142 sets a value of −1 that indicates a non-face in the certain table when an attribute of image data is a non-face. The certain table is where various units of data are set when the importance calculation unit 142 executes importance calculation processing.

The importance calculation unit 142 selects one image to be processed from the data received from the local operator processing unit 141. Moreover, the importance calculation unit 142 selects one of local operators of the selected image. For example, the importance calculation unit 142 selects the image data No. 1 as an image to be processed when the importance calculation unit 142 receives image data No. 1 to No. 12 from the local operator processing unit 141. The importance calculation unit 142 selects the local operator 1 to be processed from the selected image data No. 1.

After selecting the local operator, the importance calculation unit 142 acquires a value that corresponds to the coefficient value of the selected local operator from the learning data storage unit 131. In other words, the importance calculation unit 142 acquires a value of "e" or "f." The importance calculation unit 142 sets the acquired value, "e" or "f" as a value that correspond to a coefficient value in the certain table in association with the image data No.

For example, assuming the importance calculation unit 142 selects the local operator 1 of the image data No. 1, the coefficient value of the local operator 1 is 0 (FIG. 7). Accordingly, the importance calculation unit 142 refers to the learning data storage unit (FIG. 3), and acquires the computed value of "f" that indicates likelihood of the value is 0. The importance calculation unit 142, for example, as illustrated in FIG. 8, sets an absolute value 0.222 of the acquired "f" value, −0.222 in the certain table in association with the image data No. 1.

After acquiring a value corresponding to the coefficient value of the selected local operator, the importance calculation unit 142 sets a value indicating an attribute that the image data has in the table in association with the image data No. based on a sign of a value of "e" or "f." For example, when a value of "a" for the selected local operator is larger than that of "c", a sign of a value "e" that is obtained as a result of calculation by the above described expression (1) becomes "+." In other words, when a ratio that a coefficient value for the face learning data is 1 (a value of "a") is larger than a ratio that a coefficient value for the non-face learning data is 1 (a value of "c"), it may be determined that a degree of contribution of the selected local operator in determining likelihood of a face is high. Accordingly, when a sign of value "e" is "+", an attribute that corresponds to a sign "+" of "e" is determined to be a face. Conversely, when a value of "a" is smaller than that of "c", a sign of a value "e" that is obtained as a result of the calculation by the above described expression (1) becomes "−." In other words, when a ratio that a coefficient value for the face learning data is 1 (a value of "a") is smaller than a ratio that that a coefficient value for the non-face learning data is 1 (a value of "c"), it may be determined that a degree of contribution of the selected local operator in determining likelihood of a face is low. Thus, when a sign of a value "e" is "−", an attribute that corresponds to a sign "−" of a value "e" is determined to be a "non-face." Likewise, an attribute that corresponds to a sign "+" of a value "f" that is obtained as a result of calculation by the above described expression (2) is determined to be a "face" and an attribute that corresponds to a sign "−" of a value "f" is determined to be a "non-face."

For example, as illustrated in FIG. 8, the importance calculation unit 142 sets "−1" that indicates the attribute is non-face in the certain table in association with the image data No. 1 based on the sign "−" of the acquired value "f", "−0.222." If a sign of "e" or "f" is "+", the importance calculation unit 142 sets "1" that indicates the attribute is a "face" in the certain table.

After setting a value that indicates an attribute, the importance calculation unit 142 determines whether or not an actual attribute of an image that is selected for the processing matches with the attribute that corresponds to the sign. For example, the importance calculation unit 142 determines whether or not an attribute of an image that is selected for the processing matches with an attribute that corresponds to the sign of a value, "e" or "f." In other words, the importance calculation unit 142 determines values of "1" and "−1" that indicate the attribute of the image that is selected for the processing and the attribute by the sign of the value, "e" or "f" match or not.

For example, the importance calculation unit 142 determines that 1 that indicates an actual attribute of the image 1 and a value −1 that indicates an attribute that corresponds to a sign do not match when a local operator 1 of the image data No. 1 is selected for the processing.

When it is determined that the actual attribute of the image that is selected for the processing and the attribute that corresponds to the sign match, the importance calculation unit 142 adds a value that corresponds to a coefficient value of the selected local operator to an item of weight A of the image data No. in the certain table. A value that corresponds to a coefficient value of the selected local operator is a value, "e" or "f."

Meanwhile, when it is determined that an actual attribute of the image selected for the processing and the attribute that corresponds to the sign do not match, the importance calculation unit 142 adds a value that corresponds to a coefficient value of the selected local operator to an item of weight B of the image data No. in the certain table.

For example, when the local operator 1 of the image data No. 1 is selected for the processing, as illustrated in FIG. 8, the importance calculation unit 142 adds a value "f", "0.222" that corresponds to a coefficient value of the local operator 1 to the item of weight B in the certain table. An initial value of weight A and weight B is 0 at a start of the processing.

The importance calculation unit 142 calculates importance for each local operator. The importance calculation unit 142 stores the calculated importance in the learning data storage unit 131 in association with the local operator. For example, when calculations of importance using data regarding a coefficient value of each local operator and an attribute of an image for the image data No. 1 to No. 10 are completed, as illustrated in FIG. 8, certain tables for each of the local operators 1 to 12 are completed with data of the "weight A" and "weight B" are being set.

The importance calculation unit 142 acquires the final sum of the weight A and that of the weight B that are set for each of the certain tables of the local operators 1 to 12. The final sum of the weight A is a value that corresponds to the image No. 10 in FIG. 8. The final sum of the weight B is a value that corresponds to the image No. 10 in FIG. 8. The importance calculation unit 142 calculates importance of the local operators 1 to 12 respectively by substituting the final sums of the weight A and the weight B into the expression 3 below. The final sum of the weight A is likelihood that indicates how much an attribute of image data and an attribute of dictionary data match is plausible for each local operator. The final sum of the weight B is likelihood that how much an attribute of image data and an attribute of dictionary data do not match is plausible for each local operator. In other words, according to the second embodiment, the importance is calculated based on likelihood. Moreover, the importance is a value for adjusting the produced learning data in order to detect a specific object as in the parameter according to the first embodiment.

Expression 3

$$\text{Importance} = \log(\text{weight } A / \text{weight } B) \quad (3)$$

The detection processing unit 143 executes processing for detecting a specific object, for example, a baby, from image data that is a subject for face detection. For example, the detection processing unit 143 reads learning data for face detection and importance for each local operator from the learning data storage unit 131 when image data in which a subject for face detection processing is imaged is read through the input unit 110. The detection processing unit 143 detects the specific object from image data that is a subject for face detection by using the read learning data for face detection and importance of each local operator of the learning data. For example, the detection processing unit 143 detects the specific object from image data that is a subject for face detection using data that corresponds to the local operators with higher importance among the learning data for face detection.

The storage unit 130 may be a semiconductor memory device such as a Random Access Memory (RAM), a Read Only Memory (ROM), and a flash memory, or a storage device such as a hard disk and an optical disk.

The control unit 140 is for example, an integrated circuit such as Application Specific Integrated Circuit (ASIC) and a Field Programmable Gate Array (FPGA), and an electronic circuit such as a Central Processing Unit or a Micro Processing Unit (MPU).

Figure 9:
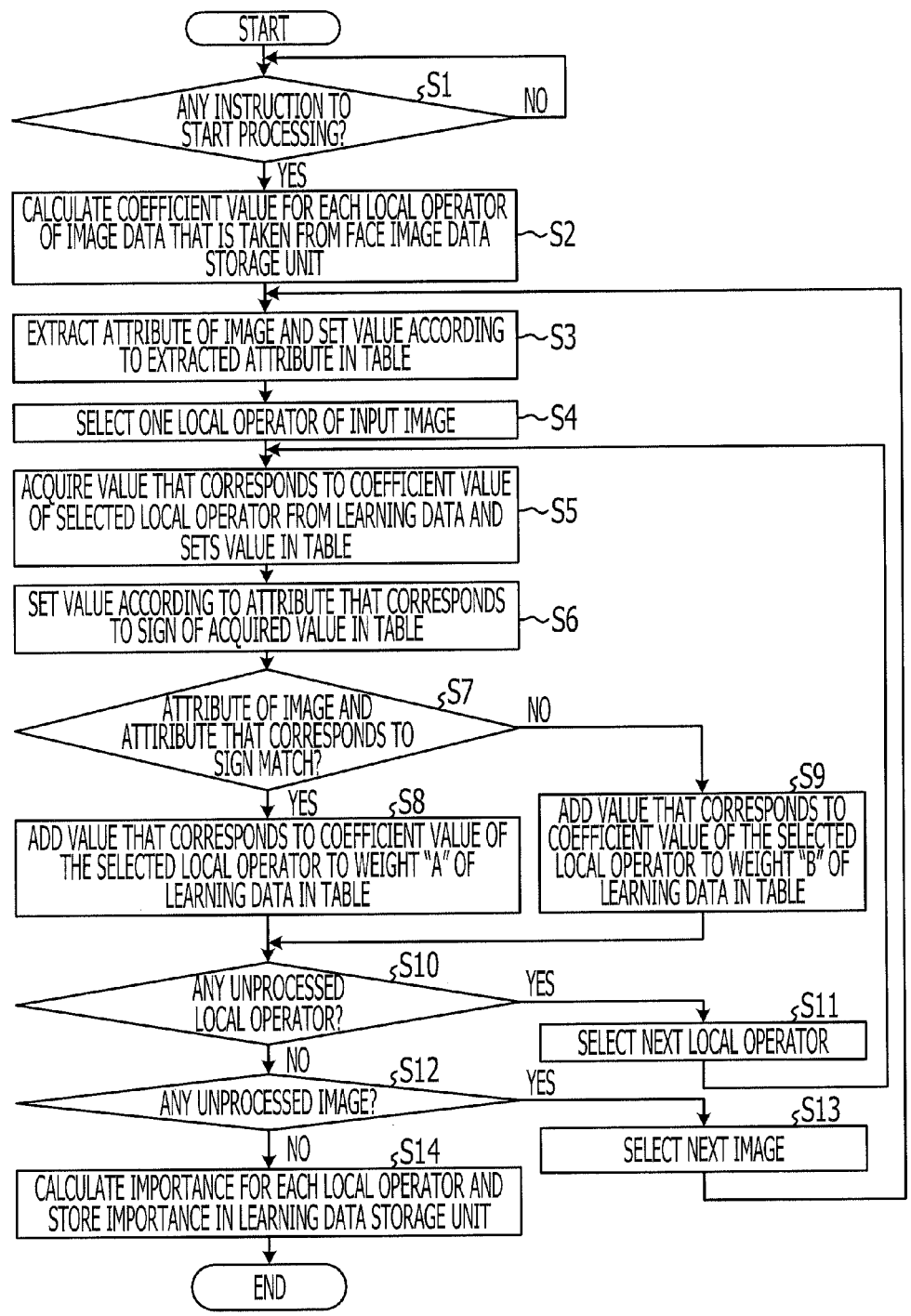
FIG. 9 is a flowchart illustrating a processing flow of the image processing device according to the second embodiment.

FIG. 9 is a flowchart illustrating a processing flow of the image processing device according to the second embodiment. As illustrated in FIG. 9, the local operator processing unit 141 performs processing as follows when the local operator processing unit 141 receives an instruction to start processing by a user etc. (S1 Yes). In other words, the local operator processing unit 141 reads all units of image data that includes and does not include a specific object that is stored in the face image data storage unit 132. The local operator processing unit 141 calculates a coefficient value for each local operator of each of the read image data (S2). The local operator processing unit 141 transmits the coefficient value for each local operator of each image data together with an attribute of the image data to the importance calculation unit 142. For example, an attribute of image data is information that indicates a baby's face or non-baby's face.

The importance calculation unit 142 extracts the attribute of each image data from data received from the local operator processing unit 141. The importance calculation unit 142 sets a value according to an extracted attribute in the certain table in association with the image data No. (S3). The certain table is, for example, as illustrated in FIG. 8. The importance calculation unit 142 selects one image to be processed from data received from the local operator processing unit 141 and selects one local operator of the selected image (S4). The importance calculation unit 142 acquires a value that corresponds to a coefficient value of the selected local operator from the learning data storage unit 131 and sets the coefficient value of the selected local operator in the certain table in association with the image data No. (S5). A value that corresponds to a coefficient value of the selected local operator is a value, "e" or "f."

The importance calculation unit 142 sets a value indicating an attribute that corresponds to a sign of the acquired value in the certain table in association with the image data No. (S6). The importance calculation unit 142 determines whether or not an actual attribute of the image selected to be processed and the attribute corresponds to the sign match (S7).

When it is determined that the actual attribute of the image selected as a subject to be processed and the attribute that corresponds to the sign match (S7 Yes), the importance calculation unit 142 adds a value that corresponds to a coefficient value of the selected local operator to the item of the weight A of the image data No. in the certain table (S8). When it is determined that the actual attribute of the image selected as a subject to be processed and the attribute that corresponds to the sign do not match (S7 No), the importance calculation unit 142 adds a value that corresponds to a coefficient value of the selected local operator to the item of the weight B of the image data No. in the certain table (S9).

The importance calculation unit 142 determines whether or not there is any unprocessed local operator in the image that is selected as a subject to be processed (S10 Yes). If there is any unprocessed local operator (S10 Yes), the importance calculation unit 142 selects next local operator included in the image data selected as a subject to be processed (S11). The importance calculation unit 142 executes the above-described processing of S4 to S10 for the selected next local operator.

When there is no unprocessed local operator (S10 No), the importance calculation unit 142 determines whether or not there is any unprocessed image data (S12). When there is any unprocessed image data (S12 Yes), the importance calculation unit 142 selects next image data from unprocessed image data (S13). The importance calculation unit 142 executes the above-described processing of S3 to S10 for the selected next image.

When there is no unprocessed image data (S12 No), the importance calculation unit 142 calculates importance for each local operator using the above-described expression 3. The importance calculation unit 142 stores the importance in the learning data storage unit 131 in association with the local operator (S14).

The above described flow of the processing by the image processing device may not necessarily be performed by the order illustrated in FIG. 9. For example, the order of processing of S10 and S12 in FIG. 9 may be changed.

Figure 10:
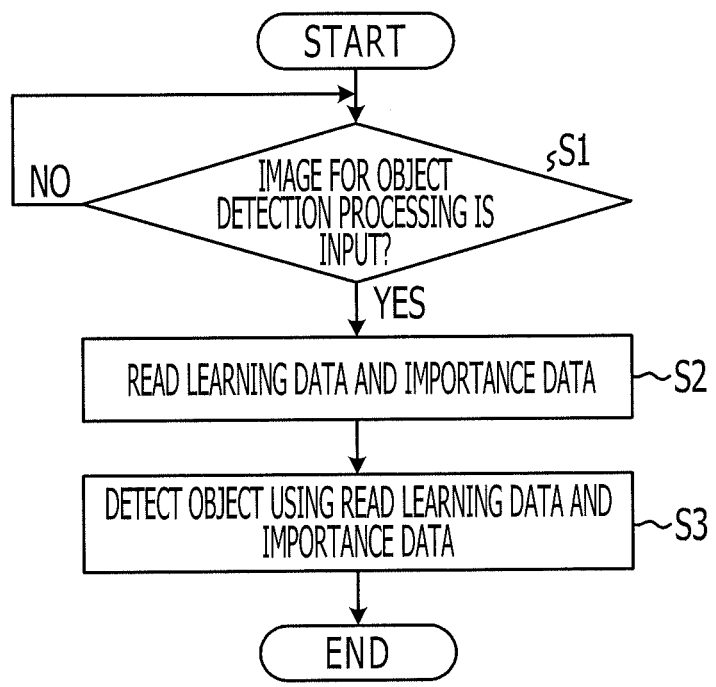
FIG. 10 is a flowchart illustrating processing flow of the image processing device according to the second embodiment.

FIG. 10 is a flowchart illustrating processing by the image processing device according to the second embodiment. When image data in which an object for a face detection processing is imaged is input to the detection processing unit 143 through the input unit 110 (S1 Yes), the detection processing unit 143 reads the learning data for face detection and importance for each local operator from the learning data storage unit 131 (S2). The detection processing unit 143 detects a specific object from the image data that is a subject for face detection by using the read learning data for the face detection and the importance for each local operator of the learning data (S3).

As described above, according to the second embodiment, the image processing device 100 calculates importance for determining how the dictionary data regarding general features is used. Accordingly, the image processing device 100 may efficiently generate data for detecting a specific object from an image based on the learning data that is already produced. In other words, the image processing device 100 does not need to newly create the learning data regarding features that the specific object has.

Moreover, according to the second embodiment, the image processing device 100 detects a specific object from image data that is a subject for face detection processing by using the learning data and importance in the learning data. Accordingly, the image processing device 100 may accurately detect a specific object from an image based on the learning data that is already produced.

Moreover, according to the second embodiment, the image processing device 100 applies wavelet conversion to respective areas that are set to each of the plurality of units of learning data. The image processing device 100 binarizes the obtained coefficient values and computes values that indicate which of the coefficient values is more plausible among the binarized coefficient values. The image processing device 100 calculates importance for adjusting the learning data for face detection regarding a specific object using the computed values. Accordingly, the image processing device 100 may calculate importance for adjusting the learning data for face detection easily and efficiently.

According to the second embodiment, the image processing device 100 computes, for each local operator that is obtained by dividing the learning data into a plurality of areas, values that indicate which of the coefficient values is more plausible among binarized coefficient values. The image processing device 100 calculates importance for adjusting the learning data for face detection regarding a specific object using the calculated values. Accordingly, the image processing device 100 may calculate importance for adjusting the learning data for face detection for each of the plurality of areas included in the learning data easily and efficiently.

The imaging device that includes the image processing device 100 according to the embodiment may execute detection processing for a specific object for captured image data before photographing using the above described importance. For example, an imaging device such as a digital camera may have a display screen that displays an image being captured in order to support photographing by the user. Hence, the imaging device may detect the specific object in the image displayed in the display screen and display the specific object with a marking in the image. The imaging device may focus on the detected specific object and store the captured image in a memory based on the user's photographing operation.

In the above-described second embodiment, a case is described in which a specific object is detected from image data that is a subject of face detection by using the learning data and importance for each local operator of the learning data. Here, some examples of a method to use the learning data according to the importance for detecting an object from image data that is a subject of face detection will be described. For example, the detection processing unit 143 compares each local operator of the learning data with each local operator of image data that is a subject of face detection sequentially in the order of importance when the detection processing unit 143 detects a specific object. In other words, the image processing device 100 may efficiently detect the specific object by sequentially using a local operator that represents features of the specific object most.

Moreover, the detection processing unit 143 may compare typically some of the local operators with higher importance among the local operators of the learning data with corresponding local operators of the image data that is a subject for face detection processing. In other words, the image processing device 100 may efficiently detect the specific object by using local operators that represent features of the specific object from the learning data.

For example, components of the image processing device 100 illustrated in FIG. 2 are functional concepts and may not be necessarily physically configured as illustrated. In other words, specific embodiments of distribution and integration of the image processing device 100 may not necessarily be as illustrated. For example, the local operator processing unit 141 and the importance calculation unit 142 may be functionally or physically integrated. As described above, all or part of the image processing device 100 may be functionally or physically distribute or integrate with any unit depending on various loads and usage status.

The image processing method described hereunder is achieved by processing illustrated in FIG. 9 and FIG. 10 that are executed by the above-described imaging processing device 100.

In other words, the image processing method achieved by the processing executed by the image processing device 100 includes processing of computing feature data of an input image based on information of the input image that includes a specific object among objects. Moreover, the image processing method includes processing to calculate a parameter for adjusting the dictionary data regarding a specific object based on the dictionary data regarding features that the object has and the above-described computed feature data.

Various processing of the image processing device 100 described in the above embodiment may be achieved by executing a prepared program by a computer system such as a personal computer or a work station.

Figure 11:
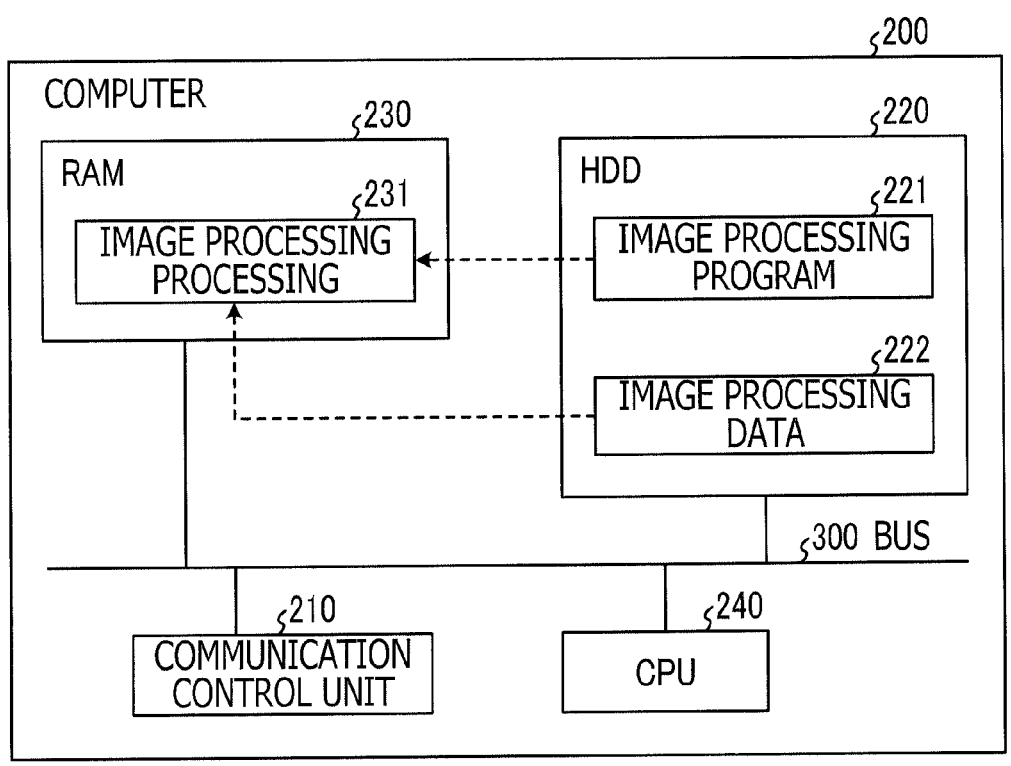
FIG. 11 illustrates a computer that executes an image processing program.

Accordingly, hereunder, an exemplary computer will be described by referring to FIG. 11 that executes an image processing program providing substantially the same functions as those of the image processing device 100 described in the above embodiment. FIG. 11 illustrates a computer that executes an image processing program.

As illustrated in FIG. 11, a computer 200 as an image processing device 100 connects a communication control unit 210, a HDD 220, a RAM 230, and a CPU 240 through a bus 300.

The communication control unit 210 controls communication for transmitting and receiving various pieces of information. The HDD 220 stores information required to execute various processing by the CPU 240. The CPU 240 executes various arithmetic processing.

As illustrated in FIG. 11, the HDD 220 stores an image processing program 221 that provides substantially the same functions as respective processing units of the image processing device 100 illustrated in FIG. 2 and an image processing data 222.

The image processing program 221 may be divided as appropriate and be stored in a storage unit of another computer that is communicably connected through a network.

The image processing program 221 may be functioned as an image processing process 231 as illustrated in FIG. 11 when the CPU 240 reads the image processing program 221 from the HDD 220 and expands the image processing program 221 in the RAM 230.

In other words, the image processing process 231 reads an image processing data 222 etc. from the HDD 220 and expands the image processing data etc. in an area assigned to the image processing process 231 in the RAM 230. The image processing process 231 executes various processing based on the expanded data etc.

The image processing process 231 particularly relates to the processing executed by the control unit 140 of the image processing device 100 illustrated in FIG. 2.

The above-described image processing program 221 may not necessarily be stored in the HDD 220 from the beginning. For example, each program may be stored in a portable storage medium that is inserted into the computer 200 such as a flexible disk (FD), a compact disc ROM (CD-ROM), a digital versatile disk (DVD), a magneto-optical (MO) disk, or an integrated circuit (IC) card. The computer 200 may read each program from the storage medium.

Moreover, each program may be stored in another computer (or a server) that is connected to the computer 200 through a network such as a public network, the Internet, a Local Area Network (LAN), and a Wide Area Network (WAN.) The computer 200 may read each program from the computer.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

The invention claimed is:

1. An image processing device, comprising:
   a storage unit configured to store dictionary data related to features of a plurality of objects; and
   a processor that executes:
   an arithmetic process to compute feature data of an input image based on information of the input image that includes an object with a specific feature among the plurality of objects, the specific feature being a subset of the features of the plurality of objects; and
   a calculation process to calculate a parameter for adjusting the dictionary data related to the object with the specific feature based on the feature data and the dictionary data, wherein
   the arithmetic process sets a plurality of areas in the input image and computes the feature data for each of the plurality of the areas by comparing a coefficient value that is obtained by applying wavelet conversion to each of the plurality of areas with a predetermined threshold value;
   the storage unit stores the dictionary data in association with area information related to the plurality of areas; and
   the calculation process refers to the storage unit and calculates the parameter for each of the plurality of areas based on the feature data computed by the arithmetic process and the dictionary data.

2. The image processing device according to claim 1, wherein the processor further executes:
   a detection process to detect another object with the specific feature from another input image based on the calculated parameter and the dictionary data.

3. The image processing device according to claim 2, wherein the detection process determines a method to use the dictionary data in detecting the other object with the specific feature based on the calculated parameter and detects the other object using the method.

4. The image processing device according to claim 1, wherein the calculation process calculates a likelihood value between the feature data and the dictionary data and calculates the parameter based on the likelihood value.

5. The image processing device according to claim 1, wherein
   when the input image is a plurality of input images, the arithmetic process sets a plurality of areas for each of the plurality of input images and computes the feature data for each of the plurality of input images and each of the plurality of the areas;
   the storage unit stores the dictionary data in association with the area information related to the plurality of areas; and
   the calculation process refers to the storage unit and calculates the likelihood value for each of the plurality of areas of each of the plurality of input images based on the computed data and the dictionary data for each of the plurality of input images and calculates the parameter for each of the plurality of areas based on the likelihood value calculated for each of the plurality of input images.

6. An image processing method executed by a computer, the method comprising:
   computing feature data of an input image based on information of the input image that includes an object with a specific feature among a plurality of objects;
   calculating a parameter for adjusting dictionary data related to the object with the specific feature based on the dictionary data stored in a dictionary data storage unit that stores dictionary data related to features of the plurality of objects and the computed feature data, wherein the specific feature is a subset of the features of the plurality of objects,
   setting a plurality of areas in the input image and computing the feature data for each of the plurality of the areas by comparing a coefficient value that is obtained by applying wavelet conversion to each of the plurality of areas with a predetermined threshold value; and
   referring to the dictionary data storage unit that stores area information regarding the plurality of areas, and the dictionary data, and calculating the parameter for each of the plurality of areas based on the feature data and the dictionary data.

7. The image processing method according to claim 6, further comprising:
   detecting another object with the specific feature from another input image based on the calculated parameter and the dictionary data.

8. The image processing method according to claim 7, further comprising:
   determining a method to use the dictionary data in detecting the other object with the specific feature based on the calculated parameter; and detecting the other object using the method.

9. The image processing method according to claim 7, further comprising:
   when the input image is a plurality of input images, setting a plurality of areas for each of the plurality of input images, and computing the feature data for each of the plurality of input images and the plurality of areas; and
   referring to the dictionary data storage unit that stores area information related to the plurality of areas and the dictionary data, and calculating a likelihood value between the feature data and the dictionary data for each of the plurality of areas based on the computed data and the dictionary data for each of the plurality of input images, and calculating the parameter for each of the plurality of areas based on the likelihood value for the plurality of input mages.

10. The image processing method according to claim 6, further comprising:
    calculating a likelihood value between the feature data and the dictionary data and calculating the parameter based on the likelihood value.

11. The image processing method according to claim 10, further comprising:
    setting a plurality of areas in the input image and computing the feature data for each of the plurality of areas;
    calculating the likelihood value for each of the plurality of areas; and referring to the dictionary data storage unit that stores area information related to the plurality of areas and the dictionary data; and calculating the parameter for each of the plurality of areas based on the likelihood value and the dictionary data.

12. A non-transitory storage medium storing an image processing program, the image processing program causing a computer to execute:

computing feature data of an input image based on information of the input image that includes an object with a specific feature among a plurality of objects;

calculating a parameter for adjusting dictionary data related to the object with the specific feature based on the dictionary data stored in a dictionary data storage unit that stores dictionary data related to features that the plurality of objects has and the computed feature data, wherein the specific feature is a subset of the features of the plurality of objects;

setting a plurality of areas in the input image and computing the feature data for each of the plurality of the areas by comparing a coefficient value that is obtained by applying wavelet conversion to each of the plurality of areas with a predetermined threshold value; and referring to the dictionary data storage unit that stores area information regarding the plurality of areas, and the dictionary data, and calculating the parameter for each of the plurality of areas based on the feature data and the dictionary data.

13. The non-transitory storage medium according to claim 12, further causing the computer to execute:

detecting another object with the specific feature from another input image based on the calculated parameter and the dictionary data.

14. The non-transitory storage medium according to claim 13, further causing the computer to execute:

determining a method to use the dictionary data in detecting the other object with the specific feature based on the calculated parameter, and detecting the other object using the method.

15. The non-transitory storage medium according to claim 12, further causing the computer to execute:

calculating a likelihood value between the feature data and the dictionary data, and calculating the parameter based on the likelihood value.

16. The non-transitory storage medium according to claim 15, further causing the computer to execute:

setting a plurality of areas in the input image and computing feature data for each of the plurality of areas;

calculating the likelihood value for each of the plurality of areas;

referring to the dictionary data storage unit that stores area information related to the plurality of areas and the dictionary data, and calculating the parameter for each of the plurality of areas based on the likelihood value and the dictionary data.

* * * * *